US006430739B1

(12) United States Patent
Ballard

(10) Patent No.: US 6,430,739 B1
(45) Date of Patent: Aug. 6, 2002

(54) SOFTWARE EXECUTION CONTINGENT ON HOME PAGE SETTING

(75) Inventor: Clinton L. Ballard, Suquamish, WA (US)

(73) Assignee: Acceleration Software International Corporation, Poulsbo, WA (US)

( * ) Notice: Subject to any disclaimer, the term of this patent is extended or adjusted under 35 U.S.C. 154(b) by 0 days.

(21) Appl. No.: 09/354,951

(22) Filed: Jul. 16, 1999

(51) Int. Cl.$^7$ .................................................. G06F 9/44
(52) U.S. Cl. ........................ 717/100; 717/172; 717/173
(58) Field of Search ............................... 717/1, 11, 168, 717/174, 177, 100, 178; 345/500; 700/17; 707/22, 513, 524, 203; 709/200

(56) References Cited

U.S. PATENT DOCUMENTS

| | | | |
|---|---|---|---|
| 5,708,780 A | * 1/1998 | Levergood et al. | 709/217 |
| 5,812,776 A | * 9/1998 | Gifford | 709/217 |
| 5,870,559 A | * 2/1999 | Leshem et al. | 709/224 |
| 5,937,163 A | * 8/1999 | Lee et al. | 709/218 |
| 5,945,991 A | * 8/1999 | Britt et al. | 345/767 |
| 5,970,477 A | * 10/1999 | Roden | 705/32 |
| 5,974,441 A | * 10/1999 | Rogers et al. | 709/200 |
| 6,003,087 A | * 12/1999 | Housel, III et al. | 709/229 |
| 6,026,433 A | * 2/2000 | D'Arlach et al. | 709/217 |
| 6,035,330 A | * 3/2000 | Astiz et al. | 709/218 |
| 6,061,700 A | * 5/2000 | Brobst et al. | 707/517 |
| 6,085,219 A | * 7/2000 | Moriya | 709/200 |
| 6,101,510 A | * 8/2000 | Stone et al. | 707/513 |
| 6,138,149 A | * 10/2000 | Ohmura | 709/218 |
| 6,139,177 A | * 10/2000 | Venkatraman et al. | 700/83 |
| 6,141,759 A | * 10/2000 | Braddy | 713/201 |
| 6,169,988 B1 | * 1/2001 | Asakura | 707/10 |
| 6,298,356 B1 | * 2/2001 | Jawahar et al. | 707/201 |
| 6,286,136 B1 | * 9/2001 | Watanabe et al. | 717/116 |
| 6,301,707 B1 | * 10/2001 | Carroll et al. | 717/177 |

OTHER PUBLICATIONS

Anderson, "Supporting indstrial hyperwebs: lessons in scalability", ACM ICSE, pp 573–582, 1999.*

Luo et al, "The development of internet accessible rapid prototyping system", IEEE, pp 1498–1503, 1999.*

Dieberger, "Browsing the WWW by interacting with textual virtual environment a framework for experimentating with navigational methaphors", ACM Hypertext, pp 170–179, 1996.*

Loke et al, Logic programming with world wide web:, ACM Hypertext, pp 235–245, 1996.*

* cited by examiner

*Primary Examiner*—Anil Khatri
(74) *Attorney, Agent, or Firm*—Steven P. Koda Esq.

(57) ABSTRACT

The functionality of software is contingent upon the home page setting for a user. Each time a user logs onto the World Wide Web, a home page manager program checks the home page setting. If the setting is the predetermined home page, then normal operation of contingent software ensues. If the setting is not the predetermined home page, then access to the contingent software is limited or disabled. The predetermined home page is any one of a prescribed set of home pages listed at a control site. In rotational mode a plurality of prescribed home pages are rotated as the predetermined home page. In long term mode the user selects one home page from the plurality of prescribed home pages as the predetermined home page. The home page manager software also allows (i) access to a user's alternative home page, and (ii) monitoring the level of activity of software.

18 Claims, 5 Drawing Sheets

(COMPUTING ENVIRONMENT)

SOFTWARE EXECUTION CONTINGENT ON HOME PAGE SETTING

BACKGROUND OF THE INVENTION

This invention relates to a method for accessing a computer-executable software program, and more particularly to a method and apparatus for disabling or limiting execution of a computer-executable software program.

Software programs typically are distributed to end users under a license agreement which authorizes one or more end-users to execute the software program. Often the developer of the software program retains ownership to the software. Thus, once the license is terminated the end user no longer is authorized to execute the software program. It has been known for a developer to include a feature in the software program which allows the vendor to disable the software in the event that the end user fails to make a timely payment under a license agreement. For example, if an authorization code is not entered after the expiration of a license period, then it is known to automatically disable the program. If the client pays the renewal license fee, then the client is given an authorization code to enter, enabling the continued use of the software program.

SUMMARY OF THE INVENTION

According to the invention, the operation of a software program is contingent upon a predetermined setting for a global computer network home page of the end user computer. The contingent software program in varying embodiments is a browser software program for accessing the world wide web ('WWW') portion of the Internet Global Computer Network, a plug-in for use with the browser, a program relating to global computer network operations or access, or a program not related to global computer network operations or access.

When a user logs onto the world-wide web using browser software, the first web page that is presented to the user is the default home page. Such home page may be changed according to the user's preference. According to one aspect of this invention, during installation of a given software program, the home page is set to a predetermined uniform resource locator (URL) address. The URL is an address to a web page or to a common gateway interface (cgi) program that redirects the browser to another web page. The accessed web page (which is accessed either directly or via the cgi program) is referred to herein as the predetermined home page.

According to another aspect of this invention, each time the end user computer logs onto the WWW a verification software program is executed which checks the default setting of the home page. If the default setting is the predetermined URL, then normal operation and access to the given software program is allowed.

According to another aspect of this invention, if the default setting is not the predetermined URL, then access to the given software program is prevented. In some embodiments the software program is disabled. In other embodiments the functionality of the software program is curtailed. In still other embodiments the software program is deleted. In a preferred embodiment, the user is prompted to inquire whether they want to accept the predetermined URL in exchange for resuming normal functionality and access to the software program.

According to another aspect of this invention, the predetermined URL stored as the default home page is an address for a cgi program. Such cgi program accesses a control site to retrieve the predetermined home page for the current session. The predetermined home page may vary at the control of another from session to session or time to time, either periodically or aperiodically.

According to another aspect of the invention, the predetermined home page is any one of a prescribed set of home pages.

According to another aspect of the invention, in a rotational mode a plurality of home pages are rotated across the desktop as the predetermined home page during differing log-in sessions.

According to another aspect of the invention, in a long term setting mode the user can select one home page from the plurality of prescribed home pages as a fixed, long term, predetermined home page.

According to another aspect of the invention, the home pages included among the prescribed set of home pages are varied at the control of another (e.g., the software program owner, or some third party). For example, for a third party to have their web page included among the plurality of predetermined home pages that are rotated across the desktop, the third party may pay a fee to the software program owner or other party which controls the decision of what web page is the current predetermined home page.

According to another aspect of the invention, the software program whose use or functionality is contingent upon the home page setting is any one of a program which (i) supports features accessible to the end user through the predetermined home page, (ii) is a web browser or web browser plug-in program, (iii) supports global computer network computing, or (iv) is unrelated to global computer network computing.

According to another aspect of this invention, the predetermined home page, or web browser button bar, includes a hyperlink to an alternative home page. Such alternative home page is set to be the prior home page when the contingent software program is installed. In addition, the end user may adjust the setting for such alternative home page to be any desired WWW page site. In one embodiment the alternative home page is set in a "cookie" on the user's computer, (i.e., information stored in the client computer associated with a specific web site and index, so that it can be retrieved at a later date). Upon accessing the button for the alternative home page on the predetermined home page, a cgi program is executed which accesses the cookie to direct the browser to the user's selected alternative home page.

According to another aspect of the invention, the setting for the alternative home page is sent to the control site where statistics are accumulated among many users to monitor the popularity or selection of home pages.

According to another aspect of the invention, the control site receives communications from the user computer including information on the execution of select software programs by the user computer. In particular the control site is able to monitor the activity level of various software computer program products executed on the end user computer.

According to another aspect of the invention, downloadable executable software files (e.g., JAVA files) received from the global computer network include a tracking identification which allows performance monitoring of such downloaded software file. Such identification code is sent to the control site upon successful execution of the downloaded file.

According to an advantage of this invention, end users are able to get free access and execution of the contingent software programs. According to another advantage of this invention, the software developer of the contingent software programs is able to receive compensation from third parties who receive the benefit of providing content to an end-user's home page (e.g., as advertising space on a given home page or as content and hyperlinks on the home page itself). According to another advantage of this invention, the activity level of select software programs and select downloadable executable files is monitored allowing the developer to determine how effectively their software is meeting end user needs.

These and other aspects and advantages of the invention will be better understood by reference to the following detailed description taken in conjunction with the accompanying drawings.

DESCRIPTION OF SPECIFIC EMBODIMENTS

Host Network Environment

Figure 1:
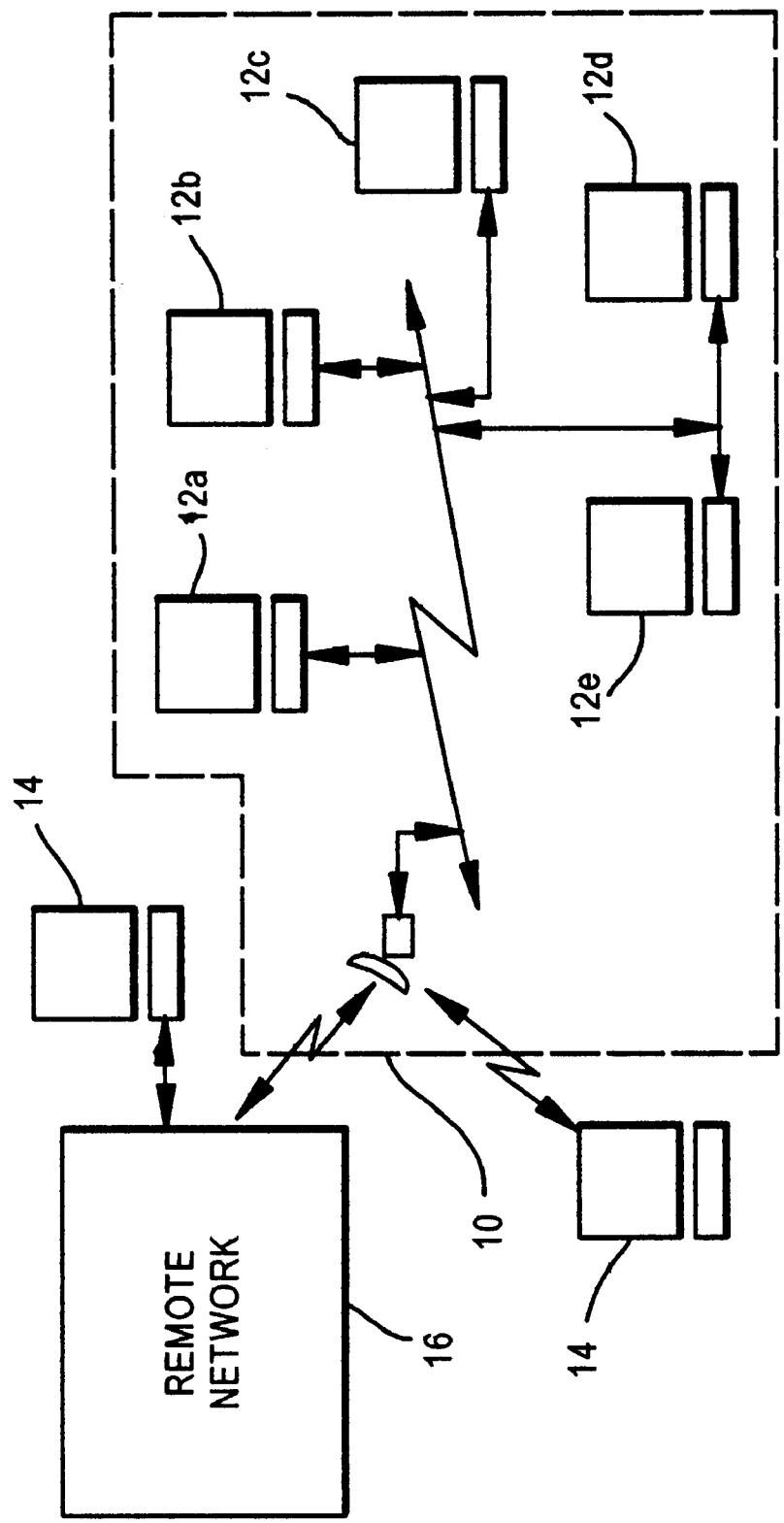
FIG. 1 is a schematic diagram of a global computer network.

FIG. 1 shows a global computer network 10 formed by a plurality of network server computers 12 which are interlinked. Each network server computer 12 stores files accessible to other network server computers 12 and to client computers 14 and networks 16 which link into the global computer network 10. The configuration of the network 10 may change over time as client computers 14 and one or more networks 16 connect and disconnect from the network 10. For example, when a client computer 14 and a network 16 are connected with the network servers computers 12, the global computer network includes such client computer 14 and network 16. As used herein the term computer includes any device or machine capable of accepting data, applying prescribed processes to the data, and supplying results of the processes.

The global computer network 10 stores information which is accessible to the network server computers 12, remote networks 16 and client computers 14. The information is accessible as files. The term file as used herein, includes files (as per the Windows operating system usage), documents (as per the MacOS operating system usage), pages (as per the world wide web phraseology usage), and other records, entries or terminology used to describe a unit of a data base, a unit of a file system or a unit of another data or information resource. Typically, there are text files, binary files, audio files, video files, multimedia files, and other types of data files and executable files stored on the global computer network.

A client computer 14 accesses the global computer network 10 by a wired or a wireless transfer medium. A user accesses the internet, for example, using a modem and the standard telephone communication network. Alternative carrier systems such as cable and satellite communication systems also are being contemplated for delivery of internet and wide area network services. The formal definition of the "Internet" is the global information system that (i) is logically linked together by a globally unique address space based on the Internet Protocol (IP) or its subsequent extensions/follow-ons; (ii) is able to support communications using the Transmission Control Protocol/Internet Protocol (TCP/IP) suite or its subsequent extensions/follow-ons, and/or other IP-compatible protocols; and (iii) provides, uses or makes accessible, either publicly or privately, high level services layered on the communications and related infrastructure. The term "Internet" is commonly used to refer to the physical structure, including client and server computers and the phone lines that connect everything into a global information system. The common categories of information services available over the internet include information retrieval services, information search services, communication services, and multimedia information services. The information retrieval services include FTP and Gopher. The information search services include WAIS, Archie, and Veronica,. The communication services include Email, Telnet, USENET, and IRC. The multimedia information services include the World Wide Web (WWW).

The network server computers 12 are formed by main frame computers minicomputers, and/or microcomputers having one or more processors each. The server computers 12 are linked together by wired and/or wireless transfer media, such as conductive wire, fiber optic cable, and/or microwave transmission media, satellite transmission media or other conductive, optic or electromagnetic wave transmission media. The client computers 14 access a network server computer 12 by a similar wired or a wireless transfer medium. For example, a client computer 14 may link into the global computer network 10 using a modem and the standard telephone communication network. Alternative carrier systems such as cable and satellite communication systems also may be used to link into the wide area network 10. Still other private or time-shared carrier systems may be used. In one embodiment the global computer network is embodied by the Internet and its World Wide Web (WWW).

The client computer 14 is any end user computer, and may also be a mainframe computer, minicomputer or microcomputer having one or more microprocessors. The remote network 16 may be a local area network, a network added into the global computer network through an independent service provider (ISP) for the internet, or another group of computers interconnected by wired or wireless transfer media having a configuration which is either fixed or changing over time. Client computers 14 may link into and access the global computer network 10 independently or through a remote network 16.

Computer System

Figure 2:
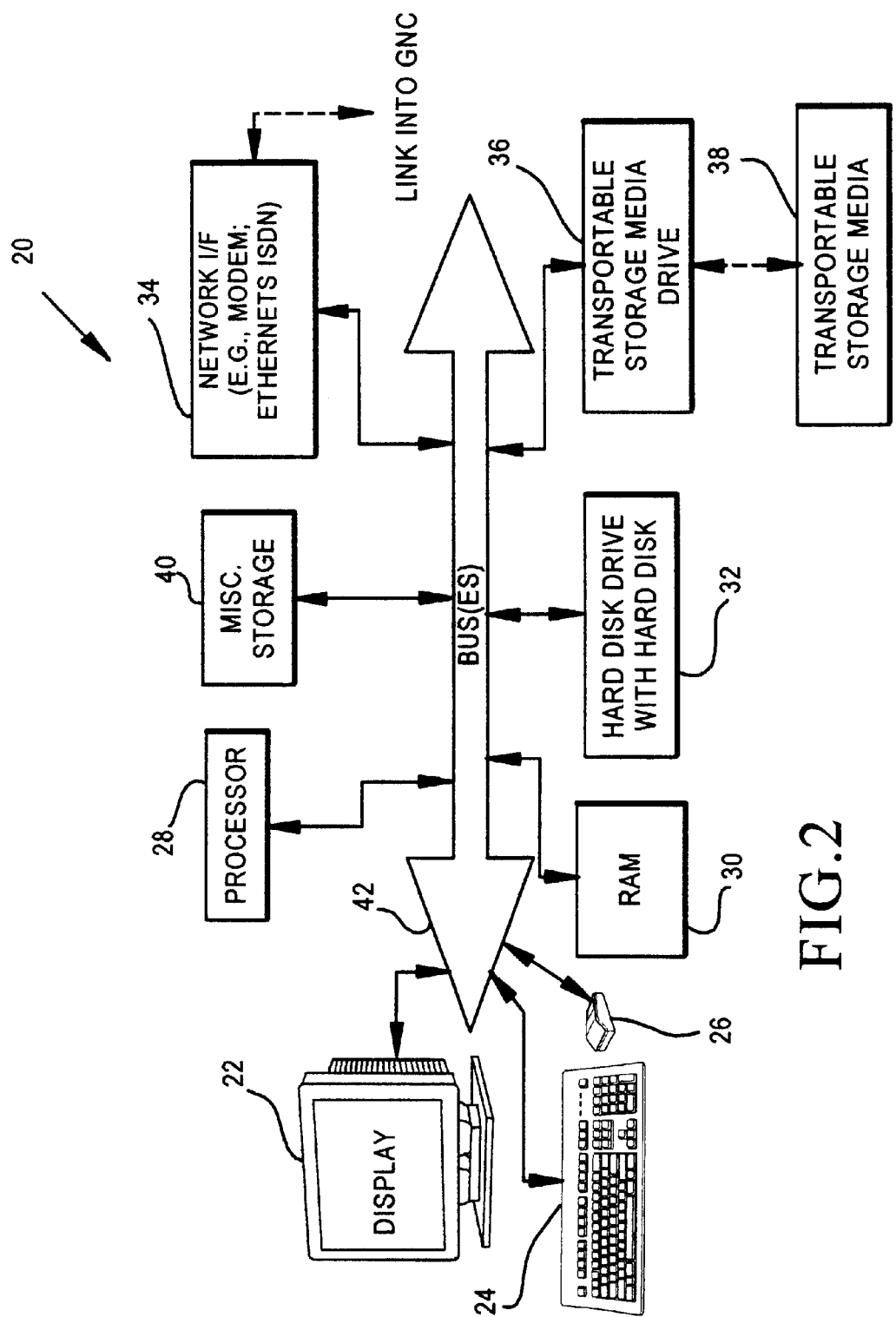
FIG. 2 is a block diagram of a computer system for a computer connected into the global computer network of FIG. 1.

The functions of the present invention preferably are performed by programmed digital computers of the type which are well known in the art, an example of which is shown in FIG. 2. A computer system 20 has a display 22, a key entry device 24, a pointing/clicking device 26, a processor 28, random access memory (RAM) 30, and a communication or network interface 34 (e.g., modem; ethernet adapter). In addition, there commonly is a non-volatile storage device such as a hard disk drive 32 and a transportable storage media drive 36 which reads transportable storage media 38. Other miscellaneous storage devices 40, such as a floppy disk drive, CD-ROM drive, zip drive, bernoulli drive or other magnetic, optical or other storage media, may be included. The various components interface and exchange data and commands through one or more busses 42. The computer system 20 receives information by entry through the key entry device 24, pointing/clicking device 26, the network interface 34 or another input device or input port. The computer system 20 may be any of the types well known in the art, such as a mainframe computer, minicomputer, or microcomputer and may serve as a network server computer 12, remote network 16 computer or a client computer 14. The computer system 20 may even be configured as a workstation, personal computer, network server, or a reducedfeature network terminal device.

Accessing the WWW

Figure 3:
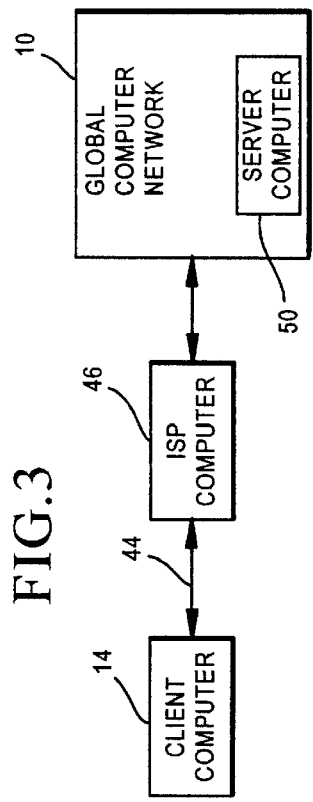
FIG. 3 is a diagram of an end user computer linked to a server computer which is linked to the global computer network.

Referring to FIG. 3, a client computer 14 accesses the global computer network 10 such as the Internet through a service provider computer 46 (such as an Internet Service Provider—'ISP'). In some embodiments, the client computer is directly linked into the network 10. When accessing the WWW portion of the global computer network 10, the client computer 14 accesses information using a uniform resource locator ('URL') address. Information from the URL is retrieved and displayed at the computer 14 display 22—such displayed information typically is referred to as a web page. Web browser software controls the communication of URL addresses and the formatting of retrieved information. An end user sets a preference accessible through the web browser software to define the URL for the first web page to be accessed and displayed upon logging onto the global computer network 10. Such first web page is referred to as the default home page. The user may changes the web browser preferences to change the default home page.

Once the user is logged onto the global computer network 10 and the home page is displayed, the user can browse other web pages. Typically, the home page has a set of hyperlinks which are preprogrammed with URL addresses for other information resources. In addition, there is a command line which allows a user to type in any URL. Typically the web browser tracks the various web pages visited in a session and allows the user to go back or forward within such list. Often the web browser allows the user to store a list of favorite web pages visited.

Another common way of browsing resources is to access a search engine at a server computer 50. Once the user accesses the web page which serves as a search engine, the user enters search criteria (e.g., keywords, URL). The search engine then retrieves a list of hyperlinks to web pages meeting the search criteria. There are several known search engines that search for WWW documents. These are accessed by URL identifier, and include, for example, Yahoo, Magellan, Lycos, Altavista, Looksmart, and Your-Portal. There also are search engines that search for audio songs, such as the MP3 based search engines.

As the global computer network becomes more and more of a communication forum for the exchange of information and services, the desire to control the content of a user's home page becomes more valuable. In a sense the home page and other web pages are potentially valuable advertising spaces, similar to the advertising applicability of the television and the radio. It is already known to include banner advertisements across a portion of a web page. The banner advertisement typically changes rapidly and supplements the generally constant information content on the remainder of the web page.

Home Page Management Plug-in Software

Figure 4:
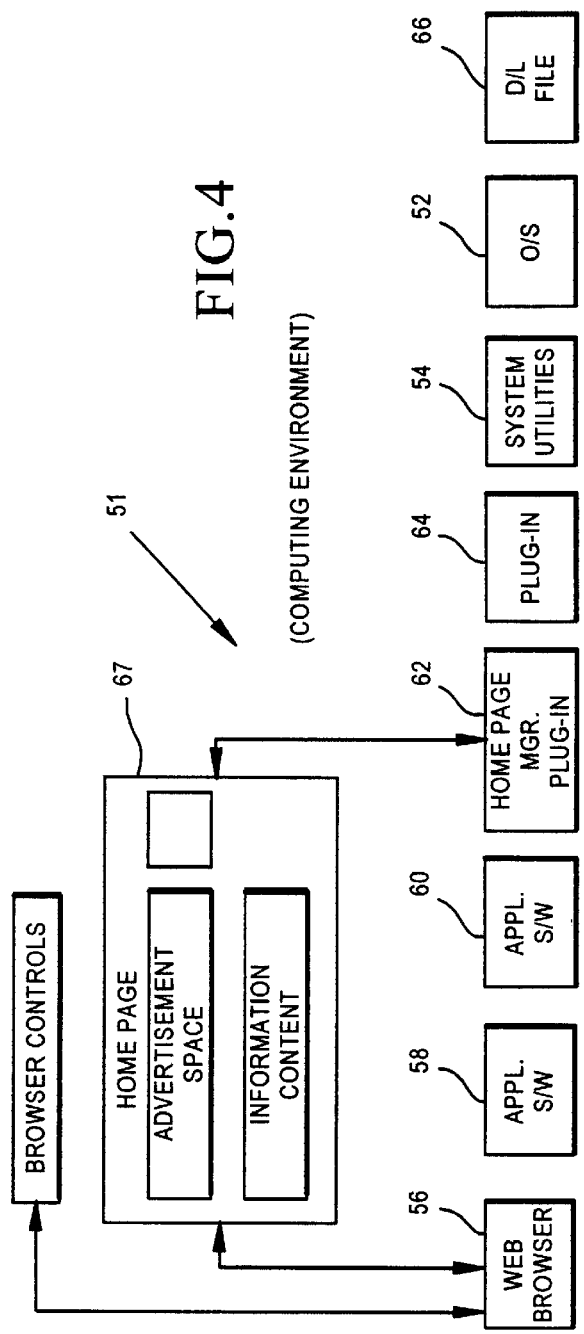
FIG. 4 is a block diagram of a global network computer computing environment.

Referring to FIG. 4, a computing environment 51 is displayed. The computing environment 51 is determined by the software programs executed by the client computer 14. Included are an operating system 52 (e.g., Apple's MacOS platform; any of Microsoft's DOS or Windows platforms; any of the permutations of the UNIX operating system; Linux or others). Also included are one or more system utilities 54 which control the operation of the computer 14 and the interaction with peripheral devices. In addition, there are one or more application programs 56–60 which greatly influence the working or playing environment for the user (e.g., games, word processors, spreadsheets, presentation graphics, accounting programs).

With the proliferation of the global computer network a common application program is a web browser program 56. The web browser (e.g., Netscape Navigator; Microsoft Internet Explorer; MOSAIC; or others) controls access to the global computer network 10. To supplement the functionality of the web browser 56 and allow more effective access to the global communication network's information resources, there typically are several additional software programs called by the web browser software 56. These programs are referred to as software plug-ins 64, because they are initiated by the web browser 56 or are initiated in relation to web browser operation or global computer network access. In addition, there may be one or more self-executing files 66 (e.g., JAVA programs or other programs or scripts) downloaded from the global computer network 10.

Figure 5:
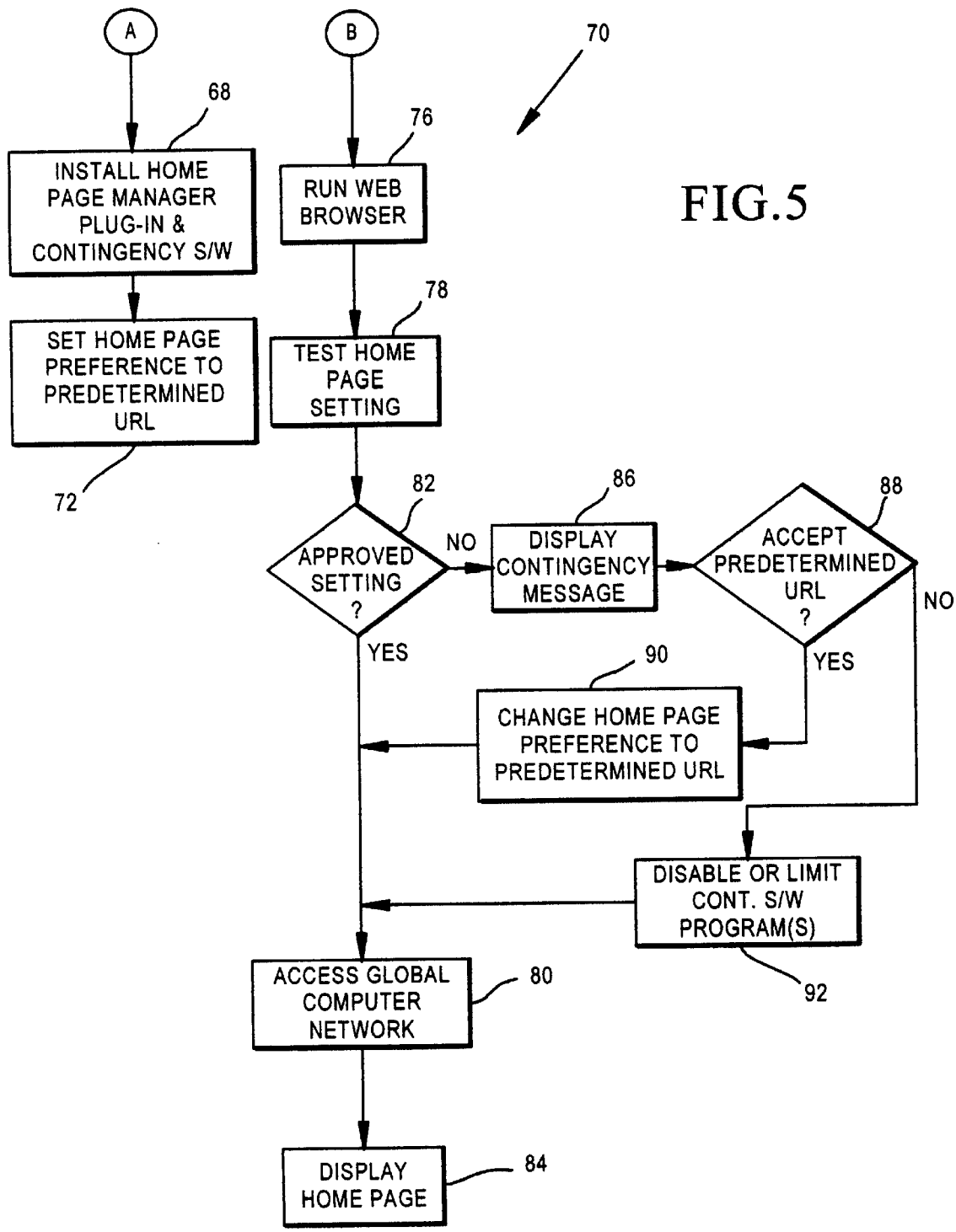
FIG. 5 is a flow chart of a method for managing the home page of an end user according to an embodiment of this invention.

Included among the applications programs or among the software plug-in programs is a home page manager program 62. This program 62 monitors the client computer 14 home page 67 and in some embodiments controls the selection of the client computer home page. Referring to FIG. 5, a flow chart 70 of a method of this invention according to one embodiment commences with a step 68. At step 68 the home page manager plug-in 62 is installed on a client computer 14 having web browser software 56 already installed. As part of the installation process, the user is informed of the terms of licensing contingent software programs. In particular, one or more contingent software programs are licensed to the end user upon the contingency that the user allow another party (e.g., the software developer or some third party) to control the selection of the user's home page. Such software is referred to as contingency software. In one embodiment the contingency software is the home page manager program 62. In another embodiment, the contingency software is the home page manager program 62 and one or more other software programs (e.g., a plug-in, a web browser, an application which is either one of related or not related to global computer network computing, a system utility or any other software program 54–66 which may be executed by the client computer 14). In still another embodiment the contingency software does not include the home page manager program 62. In some embodiments the contingency software is resident at the client computer 14. In other embodiments the contingency software is resident at a server computer 50 (see FIG. 3) accessed by the client computer 14. In other embodiments the contingency software is located both at the client computer 14 and the server computer 50.

Figure 6:
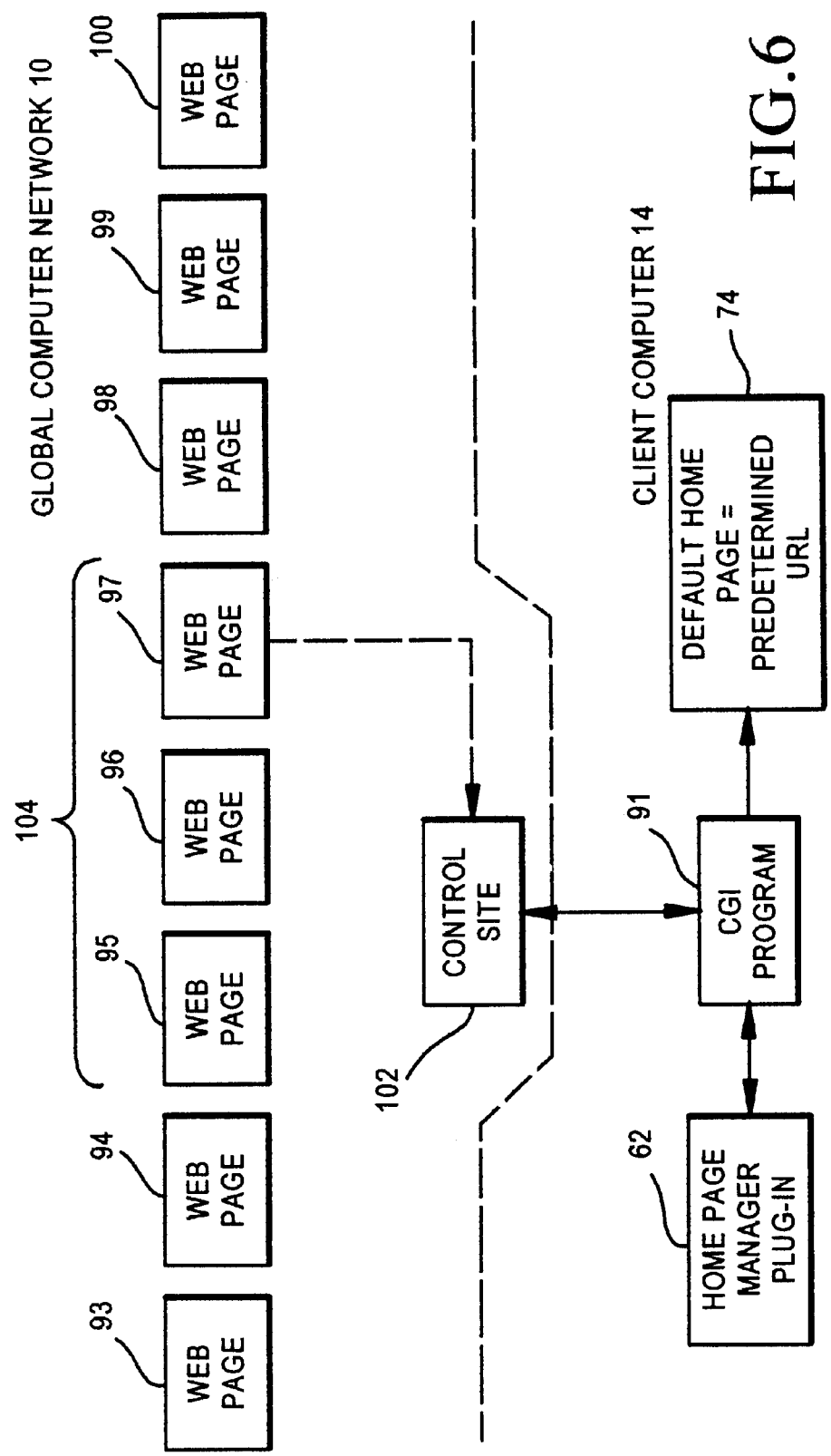
FIG. 6 is a block diagram of home page selection through a control site according to an embodiment of this invention.

If the user accepts the terms of the license, then the home page preference setting of the user's web browser 56 is set to a predetermined URL 74 (see FIG. 6). If the user does not accept the terms, then the contingency software is either (i) not installed, or (ii) installed to operate with less than full capability (e.g., limited features, or other limitation of functionality).

With the home page manager 62 installed and the default home page set to be the predetermined URL 74, at step 76 the user runs the web browser 56. The steps 76 onward need not immediately follow the installation steps 68, 72 of chain (A) and are displayed as a separate chain (B) of steps. With commencement of the web browser 56, the default home page setting of the client computer 14 is tested at step 78. After the testing procedure, the global computer network is accessed at step 80. In an alternative embodiment, the home page testing steps may be performed after commencing access to the global computer network.

At step 82, it is determined if the home page setting is for an approved home to page. The approved home page is the predetermined URL (or one of a set of predetermined URL addresses). If it is an approved setting, then access to the global computer network continues at step 80 with a predetermined home page (identified from the predetermined URL) being displayed at step 84.

If the home page setting is not for an approved URL setting (e.g., the end user changed the home page preference setting), then at step 86 a contingency message is displayed. For example, the contingency message advises the end user that for continued functionality of the contingency software the user needs to accept the predetermined URL address 74 as the home page preference setting. At step 88, a user response to the contingency message is tested. If the user accepts the predetermined URL, then at step 90 the home page preference setting is changed to be the predetermined URL address. Access to the global computer network then continues at step 80 with a predetermined home page (identified from the predetermined URL) being displayed at step 84.

If the user declines to accept the predetermined URL as the home page preference, then at step 92 the functionality of the contingency software is limited. Alternatively, the contingency software is disabled or deleted. Thereafter, access to the global computer network 10 continues at step 80 with the user's preferred home page displayed at step 84. In alternative embodiments, rather than display a contingency message, the contingency software may be automatically disabled, limited in functionality, or deleted.

In embodiments where access to the global computer network 10 commences prior to testing of the home page setting, the test becomes transparent to the user where the home page setting is set to the predetermined URL 74. Where the home page is not an approved home page, the display of the user's preferred home page is interrupted to display the contingency message and allow for the home page to be changed to the predetermined URL address.

Predetermined Home Page Selection

In one embodiment the predetermined URL is a fixed URL address to a specific web page accessible from the global computer network 10. In a preferred embodiment, however, the home page preference setting is set to a URL which executes as a common gateway interface (cgi) program 91. A URL which is a cgi invokes a program at the accessed network server, rather than invoking a static HTML web page. The cgi program 91 redirects the user's browser to another web page which is to be the predetermined home page for the current session. The cgi program accesses a control site 102 on the network 10 to find a URL address which is to be the predetermined home page for the client computer 14. The control site 102 may be located on the same server as the cgi program 91 or at another server. The control site may be accessed as a separate URL or may be a data area for access by the cgi program 91. For example, the control site 102 may be a data area for use by the cgi program or it may be a URL accessed by the cgi program to get a home page URL for the user's current session. In a preferred embodiment the control site 102 includes a list of predetermined home pages. Such list is updated by a managing party (e.g., software developer, some third party). By having a list of potential predetermined home pages, different users are able to have different predetermined home pages, either long term or which periodically or aperiodically change. In one embodiment, a set 104 of home pages are rotated to be the predetermined home page for a given client computer or end user. The cgi program 91 accesses the specific control site 102 which supplies a specific web page URL to be the current, predetermined home page for a given user. Over time (e.g., every n number of log-ons to the global computer network 10) the current predetermined home page, as accessed by the cgi program, changes. The control of which predetermined home page to route to a user may be controlled individually for each user or globally for all accesses to the server executing the cgi program 91.

Referring to FIG. 6, there are many (e.g., millions) web pages 93–100 accessible over the global computer network 10. The cgi program 91 looks to the specific control site 102 which lists a subset 104 of the web pages as potential predetermined home pages. For example, the owner of the control site 102 may charge a fee to third parties. In exchange the third party home page is listed at the control site and is rotated on the user desktops of many client computers 14 as a predetermined home page 74. In some embodiments there is a single control site 102 having a URL address. In another embodiment, the control site is a list of URL downloaded to each sever executing the cgi program 91.

In some embodiments the user is able to select a rotation mode or a long term mode for the predetermined home page. In rotation mode, the web pages in set 104 are rotated onto the user's desktop as the predetermined home page every 'n' log ons to the global computer network. Alternatively, the rotation can be weighted in which each eligible web page is given a weight. Over time, each web page is selected in proportion to its given weight. An advantage of such rotation and weighting is that third parties paying more are able to have their web page displayed as the predetermined home page a greater percentage of time than other parties paying a lesser fee. After experiencing several of such rotated home pages, the user may desire to fix on one specific web page among the set 104 as their fixed, long term, predetermined home page. The user makes such selection and switches into long term mode.

When a third party discontinues participation, their web page is no longer listed among the set 104. In such case, their web page is no longer rotated onto the user desktops as a predetermined home page. Further, the third party's web page is no longer eligible to be a long term predetermined home page. Any long term home pages set to such third party's home page are no longer approved home pages. The user therefore will be prompted to select another web page from the list of predetermined home pages or will automatically be switched into rotation mode with or without notice.

Alternative Home Page

To allow a user to easily access their prior home page, the home page manager 62 saves the prior home page URL as a cookie on the client compute, as an alternative home page. Such alternative home page may or may not be listed as an approved predetermined home page at the control site 102. Regardless, a link to such alternative home page is included either directly on the web pages eligible to be a predetermined home page or is accessed by a button added to the browser controls. When a user calls for the alternative home page from the predetermined home page another cgi program is executed which accesses the cookie on the client computer to direct the browser to the user's selected alternative home page. In some embodiment the cgi program also sends the alternative home page URL to the control site 102 which tallies the alternative home page settings of end users. Such tally is used to rate the popularity of various home pages.

Monitoring Level of Activity of Select Software

In some embodiments the home page manager 62 also performs a monitoring function for select software. The select software programs include a feature for passing a parameter to the home page manager 62 every time the select program is executed. The information passed may vary. In the simplest embodiment a fixed parameter is passed each time the select software is executed. In a more complex embodiment, a specific parameter is passed providing information on the type of activity performed by the select software. Each time the home page manager 62 is executed the parameter information is passed to the control site 102 and entered into a log file. Alternatively the parameter information is passed periodically. A party then evaluates the level of activity of various select software programs on specific or nonspecific client computers 14. The developers of such select software then are able to determine how effective their software is based on the level of activity. The select software programs may or may not be included among the contingent software.

The select software may be a software plug-in program, an application program, a system utility, or a downloaded executable file. For example, a downloaded executable file is designed to include an identification parameter which is passed to the home page manager plug-in on successful execution of the file. As a result the developers of the file (such as a JAVA file) can determine how effective the self-executing file is on the end user desktops.

Meritorious and Advantageous Effects

According to an advantage of this invention, end users are able to get free access and execution of select software programs. According to another advantage of this invention, the software developer is able to receive compensation from third parties who receive the benefit of providing content to an end-user's home page (e.g., as advertising space on a given home page or as content and hyperlinks on the home page itself). According to another advantage of this invention, the activity level of select software programs and select downloadable executable files is monitored allowing the developer to determine how effective their software is in meeting end user needs.

Although a preferred embodiment of the invention has been illustrated and described, various alternatives, modifications and equivalents may be used. Therefore, the foregoing description should not be taken as limiting the scope of the inventions which are defined by the appended claims.

What is claimed is:

1. A computer system for communicating among a global information network of resources, wherein for each resource there is a corresponding URL address, the system comprising:
    a processor for executing instructions, the instructions being organized logically into a plurality of computer programs, including a first computer program having a plurality of computing features;
    means for accessing a resource of the global information network according to a URL address corresponding to the accessed resource;
    memory means comprising a home page setting which stores a specific URL address, the home page setting being read when going online within the global information network to identify a first resource to be accessed upon going online;
    means for testing whether the home page setting is set to a prescribed URL address, and
    means for controlling enablement of the computing features of said first computer program, wherein unrestricted enablement to the computing features is contingent upon the home page setting being the prescribed URL address, and wherein enablement of the computing features is limited when the home page setting is not set to the prescribed URL.

2. The system of claim 1, wherein said unrestricted enablement is independent of whether the resource corresponding to the prescribed URL address is accessed, and wherein said enablement is independent of whether the resource corresponding to the prescribed URL address is accessed.

3. The system of claim 1, wherein the controlling means comprises means for disabling execution of the first computer program when the home page setting is not set to the prescribed URL.

4. The system of claim 1, wherein the memory means further comprises a list of authorized URL addresses, the system further comprising means for selecting the prescribed URL address from the list of authorized URL addresses.

5. The system of claim 1 as a first computer system in combination with another computer system, wherein the prescribed URL address is for a common gateway interface program which executes upon attempted access to the prescribed URL address, the common gateway interface program causes said another computer system to identify another URL address, wherein a corresponding web page for said another URL address is routed to the first computer system to be displayed as a home page when going online to the global information network.

6. The combination of claim 5, wherein said another computing system comprises:
    means for accessing a list of participating URL addresses and selecting one of the participating URL addresses to be said another URL address upon common execution of the gateway interface program, wherein the first computer system home page for accessing the global information network varies for different connections to go online to the global information network according to the selected one of the participating URL addresses.

7. The combination of claim 6, further comprising means for altering the list of participating URL addresses.

8. The combination of claim 6, further comprising:
    means for weighting each URL address in the list of participating URL addresses to select one URL address among the list of participating URL addresses to be said another URL address.

9. The combination of claim 6, in which the selected one URL address within the list of participating URL addresses is rotated upon initiating an online connection in the global information network.

10. The combination of claim 5, further comprising:
    means for sending an identification of the first computer program to said another computer system when the home page setting is set to the prescribed URL address and the prescribed URL address is accessed.

11. The combination of claim 5, in which the first computer system further comprises:
    means for monitoring a level of activity of the first computer program; and means for sending data pertaining to the level of activity of the first computer program to said another computer system when the home page setting is set to the prescribed URL address and the prescribed URL address is accessed.

12. A computer system in combination with a sever computer, the computer system for communicating among a global information network of resources, wherein for each resource there is a corresponding URL address, the computer system accessing the global information network through the server computer, the server computer controlling a plurality of features available to the computer system for accessing the global information network, the computer system comprising:
   means for requesting access to a resource of the global information network according to a URL address corresponding to the accessed resource; and
   memory means comprising a home page setting which stores a specific URL address, the home page setting being read when going online within the global information network to identify a first resource to be accessed upon going online;
the server computer comprising:
   a processor for executing instructions, the instructions being organized logically into a plurality of computer programs, including a plurality of plug-in computer programs contingently accessible to client computers for accessing the global information network;
   means for testing whether the home page setting of the computer system is set to a prescribed URL address; and
   means for controlling which of the plug-in computer programs are available for providing the computer system said plurality of features, wherein unrestricted enablement of the plurality of plug-in computer programs is contingent upon the home page setting being the prescribed URL address, and wherein access to the plurality of plug-in computer programs is restricted when the home page setting is not set to the prescribed URL.

13. The combination of claim 12, wherein the computer system memory means further comprises a list of authorized URL addresses, the computer system further comprising means for selecting the prescribed URL address from the list of authorized URL addresses.

14. The combination of claim 13, wherein the prescribed URL address is for a common gateway interface program which executes upon attempted access to the prescribed URL address, the common gateway interface program causes said another computer system to identify another URL address, wherein a corresponding web page for said another URL address is routed to the computer system to be displayed as a home page when going online to the global information network.

15. The combination of claim 14, wherein said server computer comprises:
   means for accessing a list of participating URL addresses and selecting one of the participating URL addresses to be said another URL address upon execution of the common gateway interface program, wherein a web page sent to the computer system to serve as a home page for accessing the global information network varies for different connections to the global information network according to the selected one of the participating URL addresses.

16. The combination of claim 15, wherein the server computer further comprises means for altering the list of participating URL addresses.

17. The combination of claim 15, wherein the server computer further comprising:
   means for weighting each URL address in the list of participating URL addresses to select one URL address among the list of participating URL addresses to be said another URL address.

18. The combination of claim 15, in which the selected one URL address within the list of participating URL addresses is rotated by the server computer each time the computer system requests to go online in the global information network.

* * * * *